(12) United States Patent
Bolderheij et al.

(10) Patent No.: US 7,228,874 B2
(45) Date of Patent: Jun. 12, 2007

(54) MULTIFUNCTIONAL FAUCET

(75) Inventors: Fok Cornelis Bolderheij, Brouwerij 2C, NL-3621 AD Breukelen (NL); Fritz Weld, Friedberg (DE)

(73) Assignee: Fok Cornelis Bolderheij (NL)

( * ) Notice: Subject to any disclaimer, the term of this patent is extended or adjusted under 35 U.S.C. 154(b) by 175 days.

(21) Appl. No.: 10/998,426

(22) Filed: Nov. 29, 2004

(65) Prior Publication Data

US 2005/0133100 A1     Jun. 23, 2005

Related U.S. Application Data

(63) Continuation-in-part of application No. PCT/EP2003/006573, filed on Jun. 23, 2003.

(51) Int. Cl.
*F16K 21/00* (2006.01)

(52) U.S. Cl. ............... 137/801; 251/129.04; 222/145.5; 222/145.7; 4/623

(58) Field of Classification Search ................ 137/801; 251/129.04; 222/145.5, 145.6, 145.7, 145.8; 4/623
See application file for complete search history.

(56) References Cited

U.S. PATENT DOCUMENTS

| | | | |
|---|---|---|---|
| 4,744,895 A * | 5/1988 | Gales et al. ............... 210/96.2 |
| 4,894,874 A * | 1/1990 | Wilson ........................ 4/623 |
| 4,955,535 A * | 9/1990 | Tsutsui et al. ........... 236/12.12 |
| 5,062,164 A | 11/1991 | Lee et al. | |
| 5,132,017 A * | 7/1992 | Birdsong et al. ........... 210/652 |
| 5,351,347 A | 10/1994 | Kunkel | |
| 5,535,779 A * | 7/1996 | Huang ........................ 137/559 |
| 5,867,795 A * | 2/1999 | Novis et al. ................. 455/566 |
| 5,868,311 A | 2/1999 | Cretu-Petra | |
| 5,975,124 A * | 11/1999 | Stevens, II .................. 137/392 |
| 6,093,313 A * | 7/2000 | Bovaird et al. ............... 210/94 |
| 6,179,130 B1 * | 1/2001 | Nguyen et al. .............. 210/424 |
| 6,202,980 B1 * | 3/2001 | Vincent et al. ......... 251/129.04 |
| 6,250,601 B1 * | 6/2001 | Kolar et al. ............ 251/129.04 |

FOREIGN PATENT DOCUMENTS

| | | |
|---|---|---|
| DE | 38 12 736 C1 | 11/1989 |
| DE | G 93 13 983.7 | 1/1994 |
| DE | 43 40 933 A1 | 6/1995 |
| DE | 44 15 234 A1 | 11/1995 |
| DE | 197 12 222 A1 | 10/1997 |
| DE | 200 08 256 U1 | 9/2000 |
| DE | 200 17 254 U1 | 10/2000 |
| DE | 199 27 230 A1 | 12/2000 |
| EP | 0 501 262 A1 | 9/1992 |
| EP | 0 679 770 A2 | 11/1995 |
| EP | 0 961 067 A2 | 12/1999 |
| EP | 0 978 290 A2 | 2/2000 |

* cited by examiner

*Primary Examiner*—Eric Keasel
*Assistant Examiner*—Craig M. Schneider
(74) *Attorney, Agent, or Firm*—McGlew and Tuttle, P.C.

(57) ABSTRACT

A multifunctional faucet has a dispensing faucet (2) for one or more fluids (18, 19), a sensor (3), a supply (10) for the fluids (18, 19) and a control (5). The multifunctional faucet (1) has at least one graphics-capable optical display (4), which is preferably arranged on the front side of the faucet head (36) and is connected to the control (5). The display (4) has a field display (29) or a display with a matrix of a plurality of luminous display elements.

30 Claims, 9 Drawing Sheets

MULTIFUNCTIONAL FAUCET

CROSS REFERENCE TO RELATED APPLICATION

This is a continuation-in-part of and claims the benefit (35 U.S.C. §120 and 365(c)) of copending International Application PCT/EP2003/006573 of Jun. 23, 2003, which designated inter alia the United States and which claims the priority of German Application DE-GM 202 09 799.4 of Jun. 24, 2002. The entire contents of each application is hereby incorporated by reference in its entirety.

FIELD OF THE INVENTION

The present invention pertains to a multifunctional faucet with a dispensing faucet for one or more fluids, whose state may vary, a sensor, a supply for the said fluid or fluids and a control.

BACKGROUND OF THE INVENTION

Such a multifunctional faucet has been known from DE-A 199 27 230. It comprises a dispensing faucet for a plurality of fluids, a sensor means, a supply means for the fluids and a control. The dispensing faucet has a plurality of dispensing openings for the fluids, which can be switched individually in a contactless manner via the sensor system. The fluids are above all water, disinfectant, soap and the like. The prior-art multifunctional faucet is successfully used in the area of private sanitation, but also in medicine and industry and especially in hospitals for disinfecting the hands in the operating room.

SUMMARY OF THE INVENTION

The object of the present invention is to show an improved multifunctional faucet.

According to the present invention this object is accomplished with the assignment of one or more displays, especially a graphics-capable optical display, to the multifunctional faucet or fitting to offer various advantages for the reliable, practical and intuitive operation of the multifunctional faucet. The operator can be informed with this of the particular operating state of the multifunctional faucet, the changes that occur due to the influence of the operator, and the set points and actual values of fluid states, e.g., the desired water temperature and the water temperature reached by optical signaling, but additionally also acoustically. Special operating states, such as a cleaning mode, but also problem or alarm situations, can be signalized as well.

In addition, the operator can be guided by means of the display and, in particular, operating instructions can be given in the written form or with self-explanatory symbols or pictograms. Menu guiding by various programs of the control of the multifunctional faucet is possible as well. Moreover, the display makes possible the programming and/or parametrization of the control by entering data in the multifunctional faucet.

The operator can operate the device more simply, in a more purposeful manner and more rapidly by means of the display, which is in turn connected to the control of the multifunctional faucet. Operating errors can be extensively ruled out.

Furthermore, a reader, which recognizes certain properties of the approaching persons and can identify, e.g., persons on the basis of a transponder signal, a bar code or the like, may be connected to the multifunctional faucet and operated via the display. Moreover, it is possible to monitor, e.g., preset washing cycles of the personnel.

Furthermore, it is advantageous for the control of the multifunctional faucet to be able to be connected to a higher-level control via a suitable data telecommunication interface. In addition, an alarm system circuit can be embodied in conjunction with a reader or even a proximity sensor. The multifunctional faucet with its sensor system and its display can thus also be used for other higher-level purposes, e.g., within the framework of building or hotel management.

The optical display associated with the multifunctional faucet may be a graphics-capable luminous display or a field display. Organic LEDs (light emitting diodes) are especially favorable for this. As an alternative, it may be an image projection means with a projector and a projection surface. The complete image projection means may be accommodated in one variant at the multifunctional faucet, in which case the image visible for the operator is formed on the dispensing faucet, preferably on the head area. In another variant, the projector may be mounted in the dispensing faucet and project an image to the outside onto an external projection surface. As a result, the image becomes visible in an enlarged form at another site, e.g., in a mirror behind the wash-stand, an adjacent wall or the like.

A multifunction faucet that is especially favorable for handling and maintenance has a control head, in which the display unit, the sensor means, the corresponding printed circuit board and optionally a power supply unit of its own are accommodated with one another in a common housing and connected to form an assembly unit. This control head can be easily mounted in the upper opening of the tubular discharge faucet and replaced if necessary. If a microprocessor of its own, which processes the data of the sensor means and of the display unit, is arranged on the printed circuit board, the amount of electric cables may be reduced. If an internal power supply unit especially a battery in the control head and in the supply and a wireless signal transmission via radio or the like to the control unit are used, cables may be eliminated altogether. This facilitates the maintenance and the replacement of the control head.

When the control head is operated with a battery, it may be advantageous for reasons of capacity to install the optical display, which draws a large amount of energy, away from the faucet head in another area of the multifunction faucet or in the area of the wash basin and to connect it to the power supply of the supply means, which has a higher capacity.

The use of a faucet insert, which has internally located fluid ducts with inlet-side tube connections and outlet-side outlet openings for the different fluids, is also advantageous. The faucet insert may be inserted into the upper pipe opening of the discharge faucet and fixed in the desired position by means of a perlator, aerator, water breaker or water softener, screwed in from the outside or a nozzle insert. The perlator, aerator, water breaker or water softener or the nozzle insert can be inserted and especially screwed into the corresponding discharge opening of the faucet insert through a corresponding passage opening in the jacket of the discharge pipe. The entire faucet insert can be replaced in case of damage or during maintenance procedures. The fluid lines are preferably designed as elastic tubes and can be connected with the faucet insert in a suitable manner in a quickly detachable manner. The control head may also be arranged at the upper end of the faucet insert, so that the entire unit can be replaced as a common part when necessary. The maintenance effort is substantially reduced as a result. In addition, it is favorable concerning the design effort and the manufacturing costs to design the faucet insert as a multipart insert and to provide a special insert block which consists of a corrosion-resistant material for the more corrosive fluids, such as disinfectant, soap or the like. The insert block can be detached from the faucet insert and replaced individually if necessary.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The drawings show a multifunctional faucet 1, which is intended for dispensing one or more fluids. In terms of design, the multifunctional faucet 1 may have the design according to DE-A 199 27 230. As an alternative, it may also have a different design embodiment.

In the embodiment being shown, the multifunctional faucet 1 comprises a dispensing faucet 2, which is designed in the manner of a water faucet or water tap and may be mounted, e.g., at the edge of a sink. The water faucet 2 has one or more dispensing openings 6, 7, 8 for one or more fluids, e.g., water, soap, disinfectant or the like. In the exemplary embodiment according to FIG. 1, the above-mentioned three fluids are dispensed in the desired order or optionally also in a desired mixture. In the case of the faucet according to FIG. 3, only water with the desired temperature is dispensed via the individual dispensing opening 6. The multifunctional faucet 1 has, furthermore, a supply means 10 for the fluid or the fluids.

Figures 1, 2:
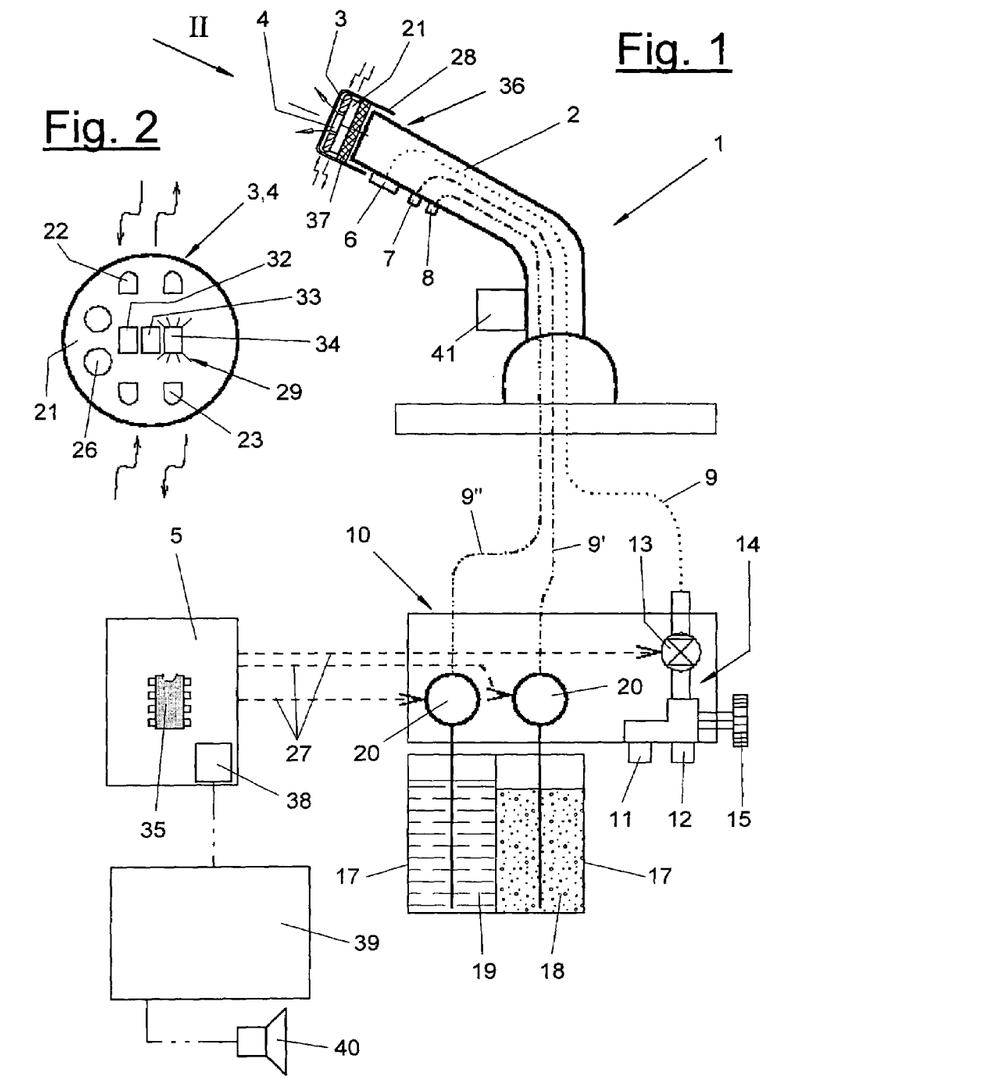
FIG. 1 is a schematic side view of a multifunctional faucet with a display.
FIG. 2 is a top view of the display according to arrow II in FIG. 1.

As is schematically indicated in FIG. 1, the control 5 may have a data telecommunication interface 38, which has, e.g., a wireless design which operates via radio, ultrasound, infrared light or the like or is designed as a wire connection with plugs. This data telecommunication interface 38 is used for communication with other, different units. This may be, e.g., a higher-level control 39, which is shown in FIG. 1 and to which additional units, e.g., an alarm system 40, may be connected. The higher-level control 39 may serve different purposes. On the one hand, it may be a control with which a plurality of multifunctional faucets 1 are united for a common control. As an alternative or in addition hereto, the higher-level control 39 may also be a control for room or building management.

Furthermore, the multifunctional faucet 1 comprises a sensor means 3 along with a connected control 5 and at least one display 4, which is likewise connected to the control 5 in a suitable manner, e.g., via electric wires 27. The power may be supplied for the parts in any suitable manner, e.g., via a regulated or unregulated plug-in power supply unit, one or more batteries, rechargeable batteries or the like. The control 5 is designed as a separate component in the embodiment being shown and is arranged at a suitable site, e.g., in the area of the supply means 10. As an alternative, it may also be integrated within the dispensing faucet 2. The control 5 comprises at least one microprocessor 35 along with the corresponding data and program memories as well as interfaces to the actuated parts of the multifunctional faucet 1 and to input/output units for the data, e.g., programming interfaces, etc. At least one function program of the type described in greater detail below, which is run by the microprocessor 35 for controlling and regulating the individual parts of the multifunctional faucet 1 and the function thereof, is stored in the data memory/memories.

The display 4 is designed as an optical display in the exemplary embodiments shown and it is located at the front side of a faucet head 36, which is arranged at the upper end of the water dispensing faucet 2. As a result, the display 4 can be seen by the user from the front in the usual position of use or operation of such faucets. As a result, the operator can see both the water dispensing faucet 2 and the fluids being dispensed there as well as the display 4 at a glance. This form and positioning of the display 4 is ergonomically highly favorable because the operator is provided with the information during the hand-washing without having to turn his head.

The sensor means 3 may have different designs. In the variant according to FIGS. 1 and 2, it comprises three sensors with different acting and scanning directions. The sensors operate in a contactless manner and respond to the existence of human body parts, especially the hands, in the area scanned by them. The upper sensors 22 have a scanned area directly upward at the water faucet 2. The lower sensors 23 act downwardly in the opposite direction. The sensors 26 have an acting direction pointing forward toward the operator from the water faucet 2 and detect the existence or approach of an operator. For example, a handicapped person can switch on the multifunctional faucet 1 by means of the front sensor 26 by moving his head and optionally also control it in case of a suitable program design.

Figures 3, 4:
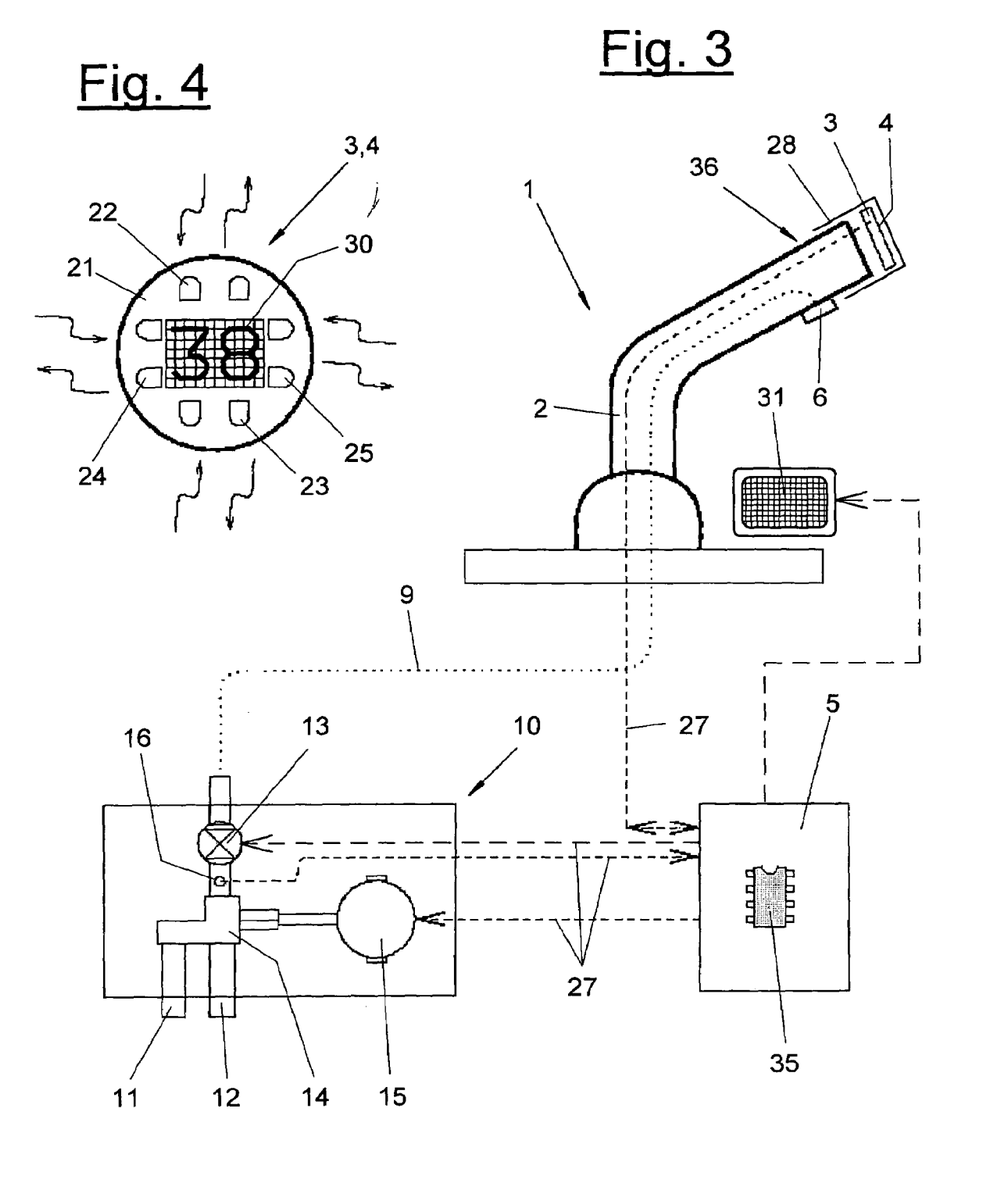
FIG. 3 is a side view of a variant of the multifunctional faucet according to FIG. 1 with another display.
FIG. 4 is the corresponding top view of the display.

Two upwardly and downwardly directed sensors 22, 23 and two lateral sensors 24, 25 directed to the left and to the right are present in the embodiment according to FIGS. 3 and 4. The said sensors may have any suitable design and be based on any suitable physical principles of measurement and detection. In the embodiment being shown, the sensors are, e.g., infrared sensors in the manner of reflected light scanners, which detect the infrared light reflected by a human body part located in the vicinity and signalize it to the control 5. The sensors and the control 5 are likewise connected here in any suitable manner, e.g., by electric wires 27. The infrared sensors contain a sender and receiver element, which are arranged next to each other at closely spaced locations. FIGS. 2 and 4 show this arrangement.

The sensors 22, 23, 24, 25, 26 are all preferably located on the front side of an electric printed circuit board 21 and are arranged distributed at the edge of the said printed circuit board in the circumferential direction. The arrangement is preferably selected to be such that the sensors have geometrically unambiguously separated scanning and action areas, which do not overlap each other. The printed circuit board 21 preferably has a shape adapted to the front side of the faucet head 36 and is designed, e.g., as a circular disk.

The optical display 4 is preferably graphics-capable and is designed, e.g., as a field display 29 or as a display 30 and is preferably likewise located on the front side of the printed circuit board 21. The display 4 is positioned here between the sensors arranged in the outer circumference of the circle. As is illustrated in FIG. 1, the printed circuit board 21, the sensors and the display 4 may be surrounded with one another by a cover 28 transparent to infrared light, which also permits, moreover, the optical detection of the display 4 from the front in a suitable manner.

Depending on the type of the sensor system, the cover 28 may also have a different design. The cover 28 may consist of, e.g., a non-see-through and nontransparent material, which is transparent to infrared light only. The display 4 may be placed in this case on the front plate of the cover 28 on the outside or integrated within the front plate. As an alternative, the cover 28 may cover the optical display 4 and be made transparent in this area. The cover 28 preferably forms a housing, which can be fastened at the top end of the dispensing faucet 2 and in which the components of the sensor means 3 and of the optical display 4 and optionally a miniaturized control 5 are accommodated.

The cover 28 may be part of the faucet head 36 and form the assembly unit for fastening the sensor means 3 and the display 4 on the dispensing faucet 2. The fixation on the dispensing faucet 2, which is usually made of metal, may be performed in any desired manner. A sealant 37, which offers sealing against moisture and against gases, e.g., lead and tin vapors, is introduced into the cover 28 under the printed circuit board 21 and under the sensor means 3 of the said printed circuit board, with said sensor means preferably placed on the front only.

FIGS. 1 and 2 show a simpler design of the optical display 4 as a field display 29. This comprises one or more luminous fields or display elements, which are arranged next to each other and consist of, e.g., LEDs with different colors. The displayed information may be signalized via the color of the LEDs switched on and/or by the type of light, e.g., continuous light or blinking light with constant or variable cycles. For example, a red LED, a green LED and a blue LED 32, 33, 34 are arranged next to each other in the field display 29.

In another variant, the field display 29 may comprise small graphics-capable luminous display elements, which consist of, e.g., a plurality of small LED lights or other small light spots in a dense matrix form. Such a field display 29 may be connected to a corresponding graphics drive unit, which makes it possible to visualize more complex image contents, e.g., symbols, numbers or characters or self-explanatory pictograms on the individual display fields.

In the variant according to FIG. 4, the optical display 4 is designed as a graphics-capable display 30. Such a display can convey more complex information than the above-described field display 29. It may likewise have various designs for this purpose and it has, e.g., a luminous dot matrix of small LEDs, liquid crystals LCDs or other elements. The display 4 optionally has a back-lighting in the case of passive matrix elements. As is illustrated in FIG. 4, a number, here the water temperature, may be displayed, e.g., via the display 30. In the case of correspondingly more complex displays 30, information may also be signalized in another manner, e.g., in multiple lines with moving text or the like.

Contrary to the field display 29, the graphics-capable display 30 forms a larger contiguous display area in the manner of a display screen or monitor in the small format. This may be, e.g., a TFT monitor. The display 30 may, furthermore, be designed as a touch-sensitive touch screen, which makes it possible to enter data by touching special sensitive areas. In particular, the field display 29 and the display 30 may make possible a color display. Besides the simple status information, more complex information can also be conveyed on a graphics-capable display 30, e.g., in the form of operating instructions or a menu guide. Such a possibility of display makes it possible to use a more complex control and to implement a substantially broader scope of functions in the multifunctional faucet 1.

Figures 5, 6:
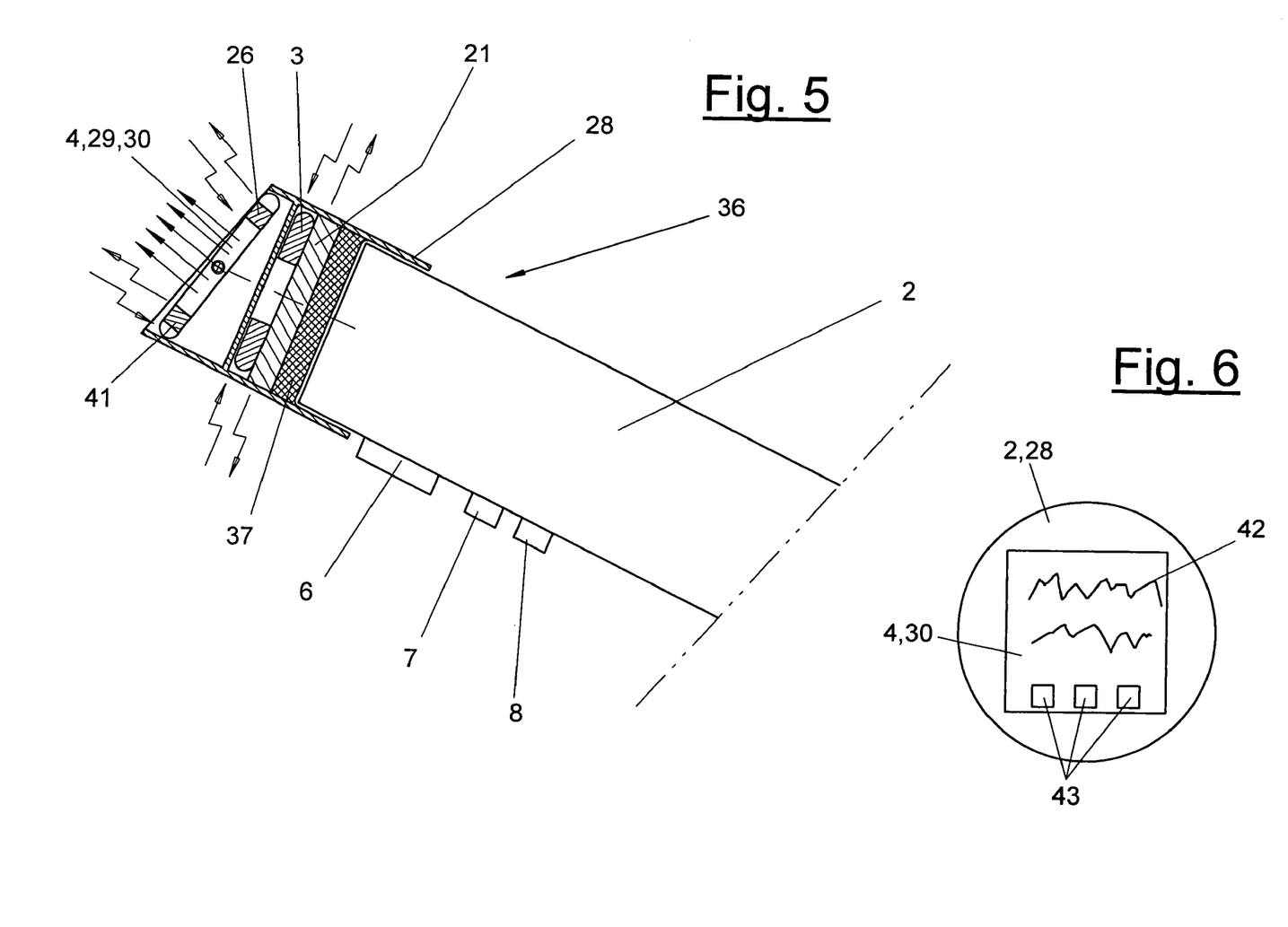
FIG. 5 is a cut-away and enlarged side view of a variant of the multifunctional faucet and the display.
FIG. 6 is a view showing a variant of the optical display.

FIG. 6 shows an embodiment of the display 30 for this. Text or display fields 42 for the operating instructions are present in the upper area. Selectively displayable switching or symbol fields 43 for menu guiding or even an entry in the case of a touch screen are located at the lower edge of the display. As switching fields of a touch screen, they can be actuated specifically and directly to trigger the desired function. As symbol fields, they are associated with the adjacent sensors 23, 24, 25 and display the particular function triggered upon the actuation of the sensor. Programming and/or parametrization of the control 5 may also be performed on the site at the multifunctional faucet 1 via such an optical display 4 and the information, messages and acknowledgments appearing here.

Figures 7, 8:
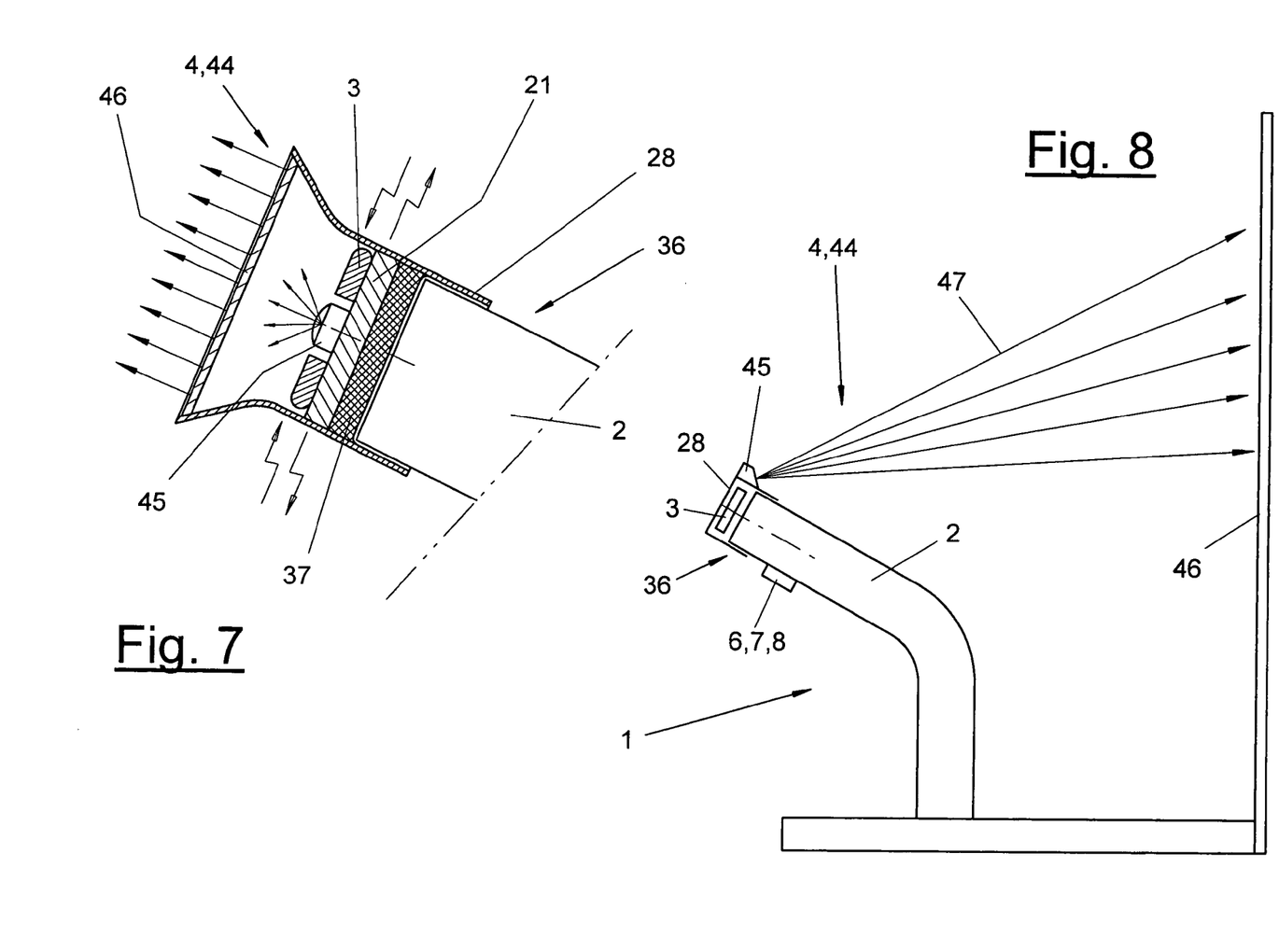
FIG. 7 is a sectional view showing another variant of the optical display.
FIG. 8 is a side view showing another variant of the optical display.

FIGS. 7 and 8 show a variant of the optical display 4 designed as an image projection means 44. This comprises a projector 45 and a projection surface 46. In the variant according to FIG. 7, the projector 45 and the projection surface 46 are accommodated together at the faucet head 36 and in the housing 28. The projector 45 is seated, e.g., next to the sensor means 3 on the front side of the printed circuit board 21. The projection surface 46 is integrated in the front side of the housing 28 and has a sufficient distance from the projector 45. The projected image can be enlarged due to this distance. The housing 28 may have a correspondingly expanded front side for this.

In the variant according to FIG. 8, the projector 45 is likewise accommodated at the faucet head 36 and in or at the housing 28. However, its image beams 47 are directed outwardly in this case and they project the image onto an external projection surface 46, which may be, e.g., a mirror on the rear side of the wash-stand or an adjacent wall or the like. The image can be further enlarged due to the distance present in this case.

Aside from the different exemplary embodiments shown and described, the optical display 4 may have any other design. It is recommended that at least parts of the optical display 4 be accommodated at the dispensing faucet 2.

FIG. 3 shows another alternative, in which an acoustic display 31, e.g., a loudspeaker or a simple sound generator, e.g., a beeper here, is present and is connected to the control 5, in addition or as an alternative to the optical display 29, 30. The display 31 may emit a simple beep tone in the simplest embodiment. Tones of different pitches, e.g., in the form of a melody, may be emitted in more complex variants. In addition, the duration of the tone may be variable. The volume may also be varied, in which case the tone becomes louder or softer corresponding to a change in fluids. A corresponding signaling may also be achieved by changing the frequency of the beep.

FIGS. 1 and 2 as well as 3 and 4 illustrate different possible embodiments of the multifunctional faucet in terms of the number, type and change of the fluids contained.

The multifunctional faucet 1 according to FIGS. 1 and 2 is used to dispense three fluids, here water, soap and disinfectant. As an alternative, it is also possible to dispense more or fewer fluids or even other fluids, e.g., a hand lotion for refatting the skin after disinfection or surgery. The addition and optionally also the metering of the fluids take place via the supply means 10. The three different fluids are sent in the exemplary embodiment according to FIGS. 1 and 2 to the dispensing openings 6, 7, 8 via separate pipelines 9 from the supply means 10 arranged in a suitable place, e.g., in a cabinet under the sink or at the lower edge of the wash-stand through the interior space of the dispensing faucet 2. Separate dispensing openings are preferably present for the different fluids. As an alternative, one or more common openings may be used as well.

A water feed 11 for hot water and a water feed 12 for cold water are connected to the supply means 10 in the exemplary embodiment according to FIGS. 1 and 2. The supply means 10 contains a mixing means 14 with a setting means 15 for mixing the water flows having different temperatures. The setting means 15 is designed as a handwheel in a simplified embodiment in FIG. 1. In addition, the mixing means may be stationary. A valve 13 connected to the control 5 via the line 27 for switching on and off the water flows being fed under pressure is located above the mixing means 14.

The soap 18 and the disinfectant 19 are contained in suitable containers 17, e.g., in bottles, and are connected to the supply means 10 via suitable delivery means, e.g., pumps 20 with suction tubes here. The pumps 20 are likewise connected to the control 5. In the case of viscous fluids or fluids that are susceptible to drying, e.g., soap, the pump motor receives a high pulsed inrush current from the control 5, and this current is subsequently reduced to the normal pump current. The high inrush current may be optionally eliminated if the demand for soap recurs frequently and if the pauses in between are so short that thickening of the fluid is not to be feared.

The amount of fluid dispensed by the water feeds 11, 12 or the pumps 20 may be metered by the control 5. If the amount of water or the delivery pressure remains essentially constant during the operation, the metering may be performed by controlling the on time or the operating time of the valve 13 and of the pump 20. Additional functions may be implemented now in the control 5 in such a way that, e.g., the water is turned off automatically when a preset maximum flow time of, e.g., 30 sec is exceeded, or when the sensor signal requesting the dispensing of water is statically present over a corresponding longer time. This safety shut-off is used to recognize and eliminate malfunctions, which may be caused, e.g., by a filled water pot in the sink or the corresponding misinterpretation by the sensor.

In the embodiment according to FIGS. 1 and 2, the upper sensor 22 is used to select the fluid. When the operator moves his hand once to a suitable proximity over the faucet head 36 and the upper sensor 22 arranged on the front side, the container 17 with the second fluid or the soap 18 is selected for the next dispensing operation. The third fluid or the disinfectant 19 is selected if the operator performs the movements twice one after another with a short interval. Water is selected in the basic setting. The above-mentioned selection is signaled by the field display 29, and the blue LED 34 is on when water is selected. The green LED 33 signals soap 18 or second fluid. The red LED 32 indicates the selection of disinfectant 19. Only the blue LED 34 shows continuous light in the normal state. If graphics-capable field elements in the matrix form are used instead of the LEDs 32, 33, 34, the selected media can be displayed by symbols or pictograms. Moreover, additional functions, such as the intensity of dispensing, temperature or the like, can be signaled by moving images. Numerical values may be displayed here as well.

The dispensing of fluid is requested via the lower sensor 23. The delivery of the fluid selected before in the above-described manner starts when the operator moves his hand in the scanned area once under the faucet head 36 or the lower sensor 23. When, e.g., water is requested, the mixing temperature can be set at a fixed value or selected by the operator by means of the handwheel 15. The pulse duty factors change continuously for the lower sensor 23 during the hand-washing, and the hands remain in the scanned area. The feed of water is switched on for a corresponding duration, and the control 5 can recognize the correct function from the continuous change in the sensor signals during the on time. As soon as the operator removes his hands from the scanned area of the lower sensor 23, which area is limited in depth, the control 5 terminates the dispensing of water.

A corresponding signaling may take place on the field display 29 during the dispensing of fluid by, e.g., the LEDS blinking alternatingly and especially in a running light switching. As an alternative, it is possible for the blue LED 34, which indicates water, to blink during the dispensing of water. This also applies analogously to a field display 29 formed by graphics-capable field elements.

The amount dispensed can be set at a fixed value in the control 5 in the case of the other fluids, namely, soap 18 or disinfectant 19. This is done on the basis of corresponding medical regulations in the case of, e.g., disinfectants. The dispensing of the fluid is then switched off after the end of the set pump running time. When the operator wishes to obtain a larger quantity of the fluid selected, he can achieve this by triggering the dispensing operation once again by correspondingly moving his hand.

Special ergonomic effects can be achieved with an automated multifunctional faucet 1 with a corresponding control 5. On the one hand, a follow-up control may be additionally embodied, which allows cold water to continue to run after switching off by the operator in order to lower a possibly high peak temperature to a mean value. A certain mean temperature of, e.g., 38° C. (38 degrees Celcius) can also be preset directly by the control 5 in conjunction with a corresponding sensor system. As a result, the next operator, unaware of the setting made by the preceding user, is prevented from obtaining water that is too hot or too cold.

Only one dispensing opening 6 for water is present in the variant according to FIGS. 3 and 4. However, the desired temperature, which is displayed by the display 30 or the above-described graphics-capable field display 29, can be set and varied. The two lateral sensors 24, 25 are responsible for setting the mixing ratio here. The setting means 15 for the mixing means 14 is designed as a motor operator or as another suitable drive means which can be remotely controlled by the control 5. In addition, a temperature sensor 16 may be arranged at the mixing means 14, e.g., after the mixing site and before the valve 13, and connected to the control 5. The temperature sensor 16 may also be located after the valve 13.

In the initial situation the display 30 displays an initial temperature as a numerical value, which is preset, e.g., by the control 5. This set point can be changed by the operator before water is dispensed by moving his left or right hand into the scanned area of the left-hand sensor 24 or the right-hand sensor 25. For example, the temperature is increased with the left hand and lowered with the right hand. The temperature changes now occurring are in turn displayed by the display 30.

When the desired temperature set point is reached, the dispensing of water can be triggered by actuating the lower sensor 23. Automatic regulation of the water dispensing temperature by the control 5 takes place by means of the temperature sensor 16 in the embodiment being shown. However, the desired temperature can also be changed during the dispensing of water in this case if desired by actuating the left-hand or right-hand sensor, with the control 5 correspondingly adjusting the water temperature. The temperature sensor 16 may also be eliminated in a variant of the embodiment being shown, and the desired water temperature is set by the operator manually in the above-described manner before and optionally during the dispensing of water.

There may be various special settings in the embodiment according to FIGS. 1 and 2. When, e.g., the left-hand and right-hand sensors 24, 25 are actuated by the operator simultaneously, a fixed value of the water temperature, which is preset in the control 5, is selected as a result.

Unlike in FIGS. 1 and 2, the upper sensor 22 has no selection function in the variant being shown. Moreover, the amount of water dispensed can be set in the case of the hot water supply according to FIGS. 3 and 4. The amount can be set by means of a chosen and selected opening time and an outlet, e.g., an aerator, water breaker or water softener, with flow regulation. When the operator briefly actuates the upper sensor 22, a first set value of, e.g., half a liter of water is selected, and this amount of water will then run off from the dispensing faucet 2 when the lower sensor 23 is actuated. If the upper sensor 22 is actuated for a longer time, a higher maximum of, e.g., up to 6 L is set. This amount corresponds, e.g., to a bucketful in a household. The amount set is likewise dispensed automatically and can also be stopped by briefly actuating the lower sensor 23. However, this flow limitation has, on the other hand, the advantage that a housewife can move away from the faucet in order to perform other tasks during the filling time. She can be certain that the preset amount will not be exceeded. She can then remove the filled bucket at the appropriate time. Furthermore, this function offers advantages for the handicapped.

The display 30 can also signalize such operations in a suitable manner and signal, e.g., the end of a preset filling operation by the blinking of the display. The display 30 may display a color change to display temperature or flow changes. The acoustic display 31 may optionally also come into action in addition or as an alternative. This may display, e.g., a change from one medium to another by a short click signal.

The exemplary embodiments shown can be changed in different manners and also combined with one another. Only one additional fluid 18, e.g., only soap, can be present in the variant according to FIGS. 1 and 2. As an alternative, there may also be more than two additional fluids. In addition, the feed of water may be eliminated, so that the multifunctional faucet 1 is used for additional fluids only. In addition, at least one auxiliary device, e.g., a warm air blower for drying the hands, may also be connected to the multifunctional faucet 1 and the dispensing faucet 2. Furthermore, a temperature control or regulating means according to FIGS. 3 and 4 may also be arranged complementarily at the multifunctional faucet 1 with the different fluids according to FIGS. 1 and 2. The sensors installed on the printed circuit board 21 will change in this case, and the front sensor 26 may be optionally added to the four sensors 22, 23, 24, 25 distributed in a cross pattern. It may also be eliminated. Likewise, the optical displays 29, 30 may also be transposed, and, e.g., the water mixing temperature is displayed in this case via the field display 29 with the LEDs having different colors or by blinking cycles. Furthermore, the arrangement and the orientation of the fields in the field display 29 are variable as well. This may also have, e.g., five LEDs arranged in a cross pattern or other display elements. It may also have a plurality of lines. It is possible in another variant to generate mixed colors by a suitable cover 28 from LEDs of different colors which are switched on simultaneously. The range of variation of the available colors is increased as a result. Furthermore, it is possible to signalize special switching states, e.g., by the blinking of one or more diodes or a corresponding display characteristic. A so-called cleaning mode, in which the normal sensor and operating functions of the multifunctional faucet 1 are switched off over an optionally preset time period to make possible the undisturbed cleaning of the sink, can be signalized as a result.

It is possible in another variant to miniaturize the control 5 and to likewise arrange it on the printed circuit board 21, e.g., on the rear side. Some of the control functions or the complete set of the control functions may be implemented in this case. A small microprocessor is arranged on the printed circuit board 21 for the control of the optical display 4 in the simplest embodiment. In more complex embodiments, the complete control 5 may be accommodated here. The different function and control programs are implemented via suitable memory building blocks here.

FIG. 5 shows another variant of the multifunctional faucet 1 and its optical display 4, which may likewise be designed as a field display 29 with individual fields or as a contiguous and monitor-like display 30 as desired. The optical display 4 is arranged in the head of the cover 28 here and may be positioned obliquely toward the operator, so that it can be read more easily. Moreover, it is possible to accommodate the optical display 4 movably in a corresponding housing with a rotary mount of the cover 28. Back-lighting is likewise possible here for all kinds of optical display 4.

FIG. 5 illustrates, furthermore, the possibility of arranging one or more proximity sensors 26, which record the approach of a person and report it to the control 5 not shown, at the optical display 4. Moreover, the multifunctional faucet 1 may be awakened from a power-saving or sleep mode and put into readiness to operate. In addition, additional functions, which will be described below, may also be embodied by means of the proximity sensor 26.

Furthermore, a reader 41 may be arranged at the optical display 4. As an alternative, this reader may be accommodated at another point of the cover 28 or, as in FIG. 1, also at the housing of the dispensing faucet 2 or in another area. The reader 41 can receive information sent preferably in a wireless manner from the outside. It may be designed for this purpose, e.g., as a transponder means, as a bar code reader or the like. The external information is preferably transmitted by the operator via corresponding information means, such as a portable transponder, a bar code strip or the like. This information may be person-related and identify the operator. This information may be evaluated and processed in a higher-level control 39 by means of a corresponding program, e.g., a personnel management program. There may be regulations concerning washing cycles in restaurants or other fields in which hygiene is critical. The compliance with these washing cycles can be checked and logged on the basis of the personal data recorded by the reader 41.

The sensor means 3 may also be used for other control and monitoring purposes by means of the control 5 and a higher-level control 39. The multifunctional faucet 1 may be used as an alarm sensor system in a hotel or other similar public areas. In this case, a door sensor system or the like, which determines whether an authorized guest is present in the room or whether he is leaving the room, is connected to the higher-level control 39. When the room is left, which is signalized, e.g., by means of a key card or the lock control, the control 5, 39 arms the multifunctional faucet 1 as an alarm sensor system. When a person enters the room without authorization and especially enters the sanitary area, this is observed by the sensor system 3. This can be determined, on the one hand, from a change in brightness when the light is switched on, or by means of the proximity sensor 26. Moreover, it can be determined by means of the reader 41 whether the entering person is a member of the staff or not. If the entering person is recognized as an unauthorized person, an open or silent alarm can be triggered by means of the control 5, 39 and an alarm system 40.

The controls 5, 39 also offer other possibilities, e.g., remote diagnosis of the state of the multifunctional faucet 1. It is also possible to determine in conjunction with a suitable sensor system whether sufficient amounts of the fluids 18, 19 are present. Moreover, it can be recognized whether an operating disturbance is present in the system and optionally the type of that operating disturbance.

FIGS. 9 through 16 show further variants of the multi-function faucet 1 on the basis of the above-described embodiments.

Figure 9:
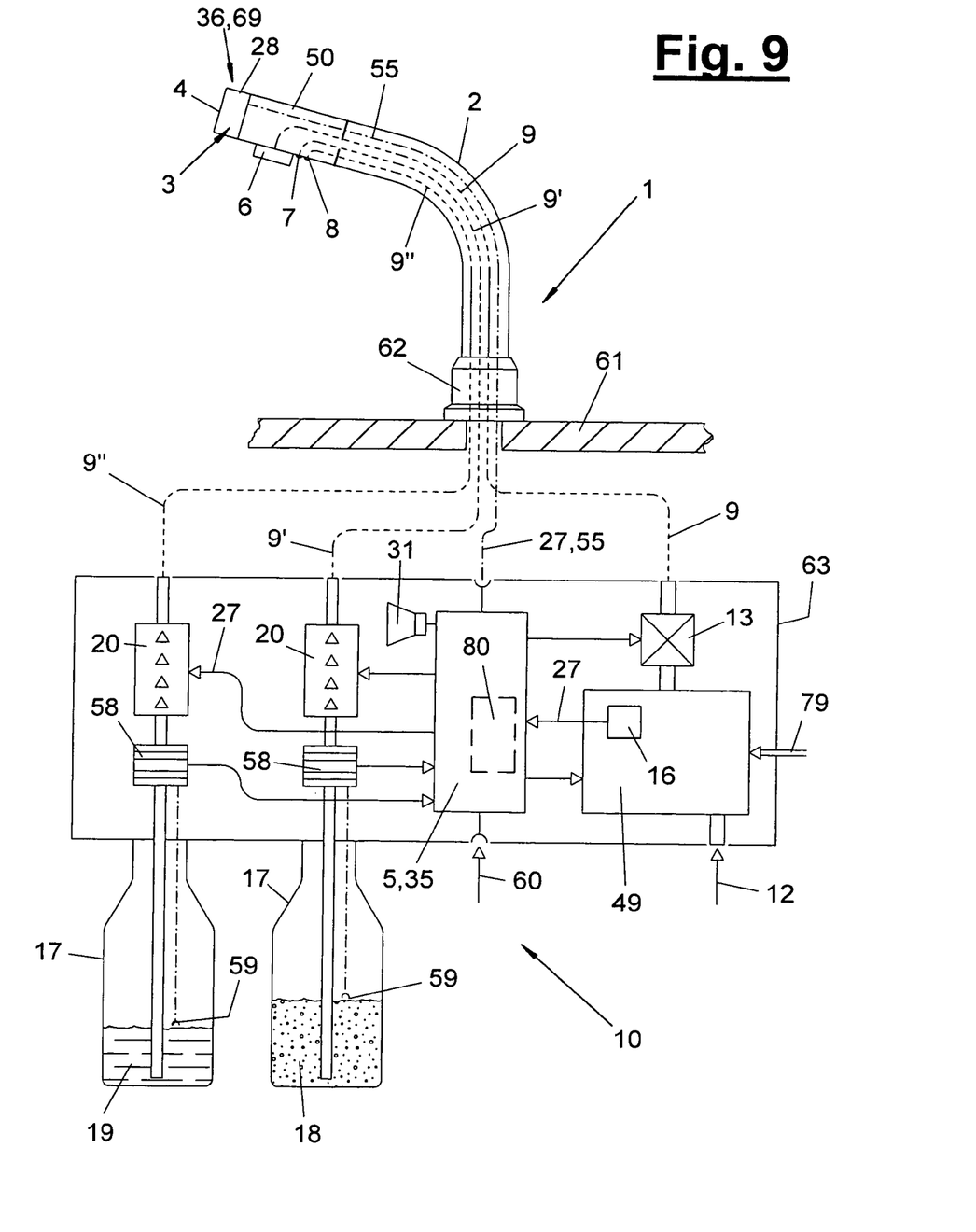
FIG. 9 is a sectional view showing a variant of the multifunction faucet according to FIG. 1.
Figure 10:
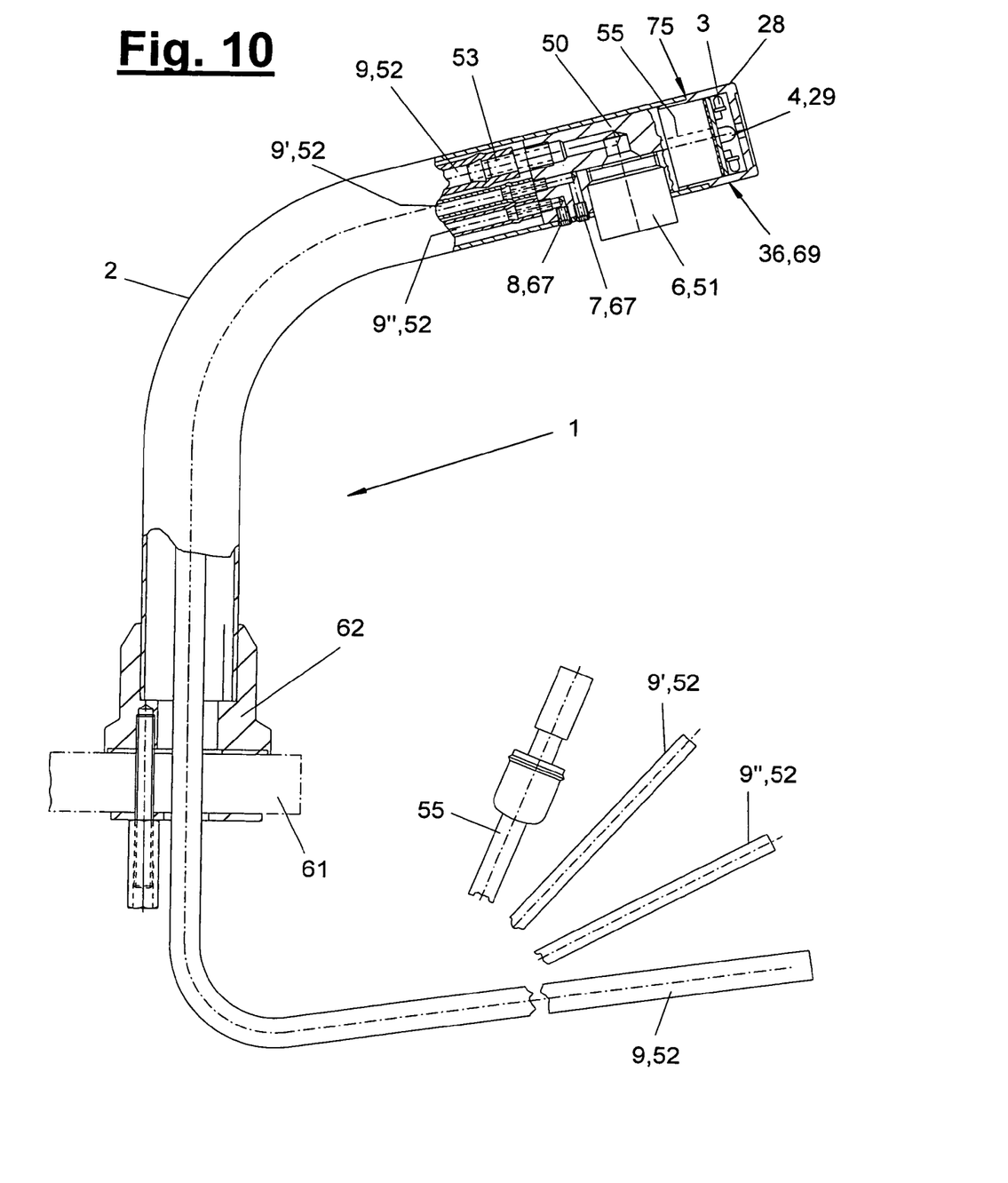
FIG. 10 is a partially sectional enlarged side view showing the multifunction faucet of FIG. 9.

As is illustrated by FIGS. 9 and 10, the discharge faucet 2 comprises a bent pipe with a narrow foot 62, which is fastened in a suitable matter in the wall of a wash basin 61, a vanity table or the like. The lines 9, 9', 9" for the different fluids as well as at least one electric line 27, 55 are led through the hollow faucet pipe individually or in a bundle. The lines 9, 9', 9" are preferably designed as elastic tubes 52 made of rubber, plastic or the like and are attached to a faucet insert 50 by means of tube couplings 53. The electric line 27, 55 may likewise be surrounded by a tube 52 and have an electric plug 56 or another electric coupling in the area of the faucet insert 50.

The faucet insert 50 is located at the upper end of the faucet pipe 2 and extends to below the last discharge opening 8. It can be plugged in and mounted from the head-side pipe opening 75. For mounting, the elastic tubes 52 can be pulled through the faucet pipe 2, attached to the tube couplings 53 and then pushed into the front-side pipe opening together with the insert 50. Corresponding statements also apply to the electric line 27, 55 and the plug 56.

The cross section of the faucet insert 50 has a shape adapted to the inside of the faucet pipe 2 and is preferably cylindrical. Ducts 54, which correspond to the lines 9, 9', 9" and the corresponding tube couplings 53, are arranged inside the faucet insert 50, which consists of, e.g., metal, especially brass. The ducts 54 have a bent shape and open at the lower jacket area of the faucet insert 50, forming the discharge openings 6, 7, 8 located there. Corresponding passage openings 68 are arranged in the jacket of the faucet pipe 2 at the same points.

The discharge opening 6 for the first fluid, especially for water, has an enlarged diameter with an internal thread, by means of which a so-called perlator, aerator, water breaker or water softener 51 can be inserted into the discharge opening 6 and screwed into the faucet insert 50. The perlator, aerator, water breaker or water softener 51 is a mixing insert and is used to make the water jet being discharged uniform. Nozzle inserts 67 or the like may be screwed into the other discharge openings 7, 8 for the other fluids.

In the screwed-in position, the perlator, aerator, water breaker or water softener 51 and the nozzle inserts 67 form a locking for fixing the faucet insert 50 in the mounted position in the faucet pipe 2. The perlator, aerator, water breaker or water softener 51 and the nozzle inserts 67 pass through the passage openings 68 and as a result prevent the faucet insert 50 from slipping in the longitudinal direction of the faucet pipe 2. The perlator, aerator, water breaker or water softener 51 and the nozzle inserts 67 can be removed for dismounting, so that the faucet insert 50 can be pulled out of the faucet pipe 2 on the front side together with the attached tubes 52.

Together with the cover 28, the sensor means 3 and the display unit 4 can form a control head 69 in the form of a complete add-on piece, which is closed in itself and can be fastened to the faucet pipe 2 directly in the pipe opening 75 or, as in the exemplary embodiments according to FIGS. 9 through 14, to the faucet insert 50. The control head 69 may have on the underside or the back side an annular mounting collar 72, which can be attached in a positive-locking manner to a mounting attachment 73 of the faucet insert 50, which said attachment has a reduced diameter, or fixed by a bonded connection or in another suitable manner. Due to this connection, the faucet insert 50 and the control head 69 can form one assembly unit, which can be inserted into the front-side pipe opening 75 as a whole. The control head 69 may have on the outside a circular collar 74, with which it comes into contact and is guided by the edge of the pipe opening 75 in a positive-locking manner. The external diameter of the control head 69 is adapted to the external diameter of the discharge faucet 2 and passes flush over into the pipe wall.

An electric line 27, 55 in the form of a multiwire power cable protrudes from the control head 69. The faucet insert 50 may have on its jacket a longitudinally extending groove 76 or duct located on the inside for receiving and passing through this cable. The cable then extends through the faucet pipe 2 to the control unit 5. The electric plug 56 or another electric coupling may also be arranged in the groove 76 or the duct in a waterproof manner. The groove 76 and the coupling 56 are arranged in an area protected from the entry of liquid and are located, e.g., on the side of the faucet insert 50 located opposite the discharge openings 6, 7, 8.

Figures 14, 15, 16:
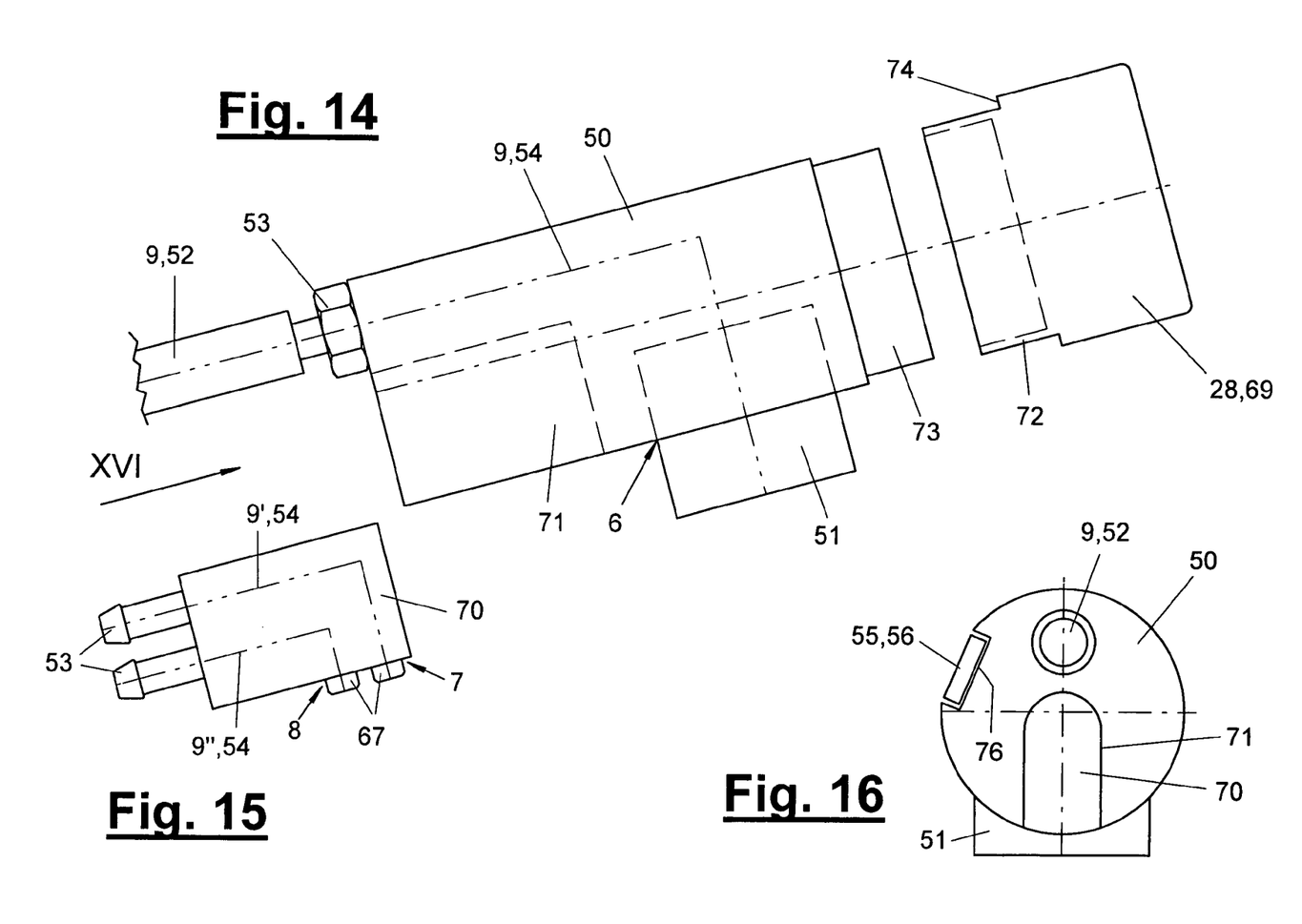
FIG. 14 is a side view of the faucet head according to FIG. 11 with an insert block.
FIG. 15 is a top view of the faucet head according to FIG. 11 with an insert block.
FIG. 16 is a end view of the faucet head according to FIG. 11 with an insert block.

FIGS. 14 through 16 show another variant of the faucet insert 50. Together with a surrounding housing part, the discharge faucets 7, 8 with the corresponding ducts 54 and the tube couplings 53 for the lines 9', 9" can form an insert block 70, which can be inserted into a faucet insert opening 71 on the faucet insert 50 in a positive-locking manner, guided and fastened by clamping or in another manner. The insert block 70 may consist of a material different from that of the faucet insert 50. Plastic, which has a higher corrosion resistance and is better suited for more corrosive media, such as soap, disinfectant or the like, is preferably used as the material for the insert block 70. The insert block 70 is designed here, e.g., as an injection molded part, with which the end-side mating sockets for the tube couplings 53 and optionally also the nozzle inserts 67 for the discharge openings 7, 8 are made integrally in one piece at the time of manufacture. The tubes 52 of the lines 9', 9" need only be plugged into the mating sockets during the mounting.

Figures 11, 12, 13:
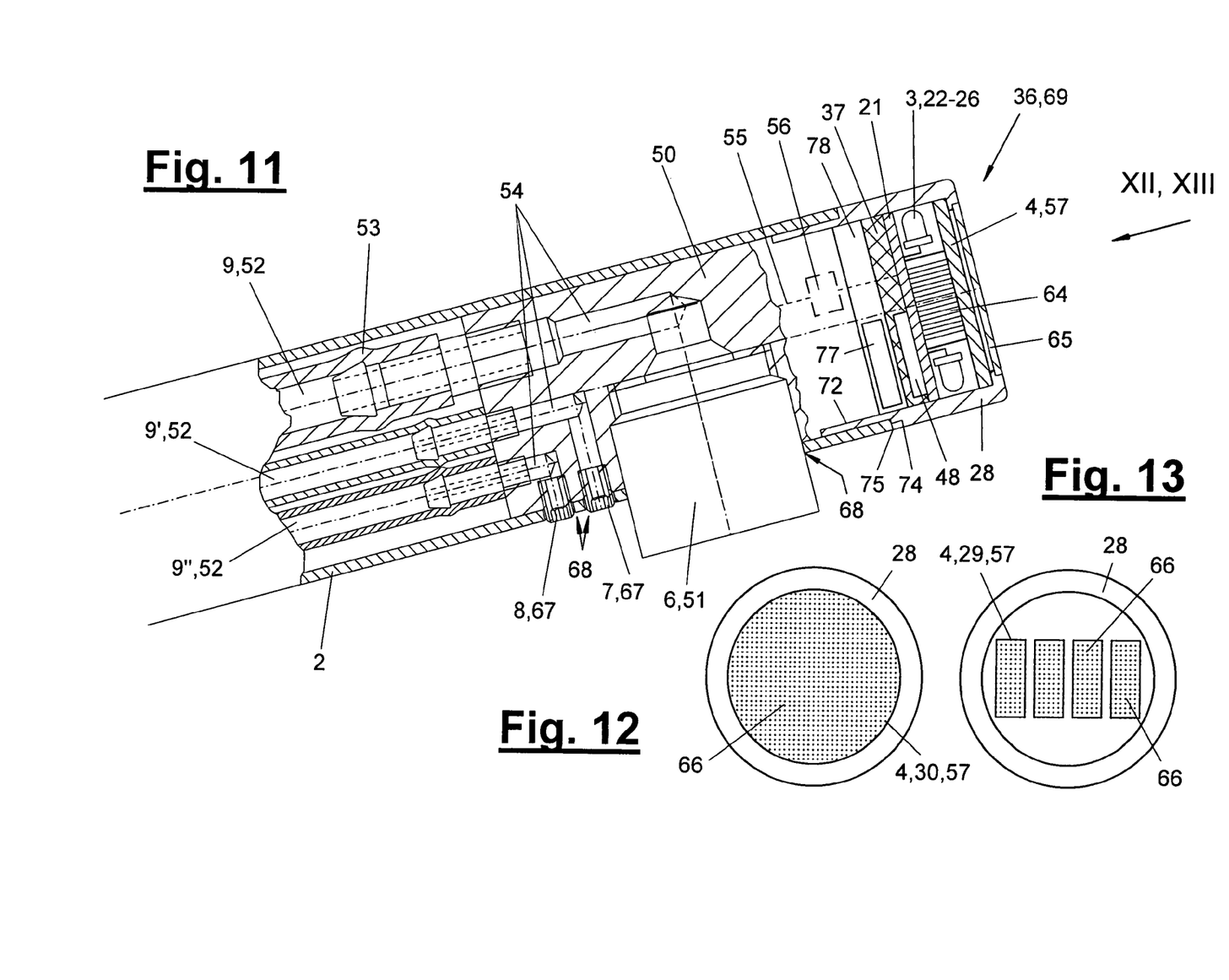
FIG. 11 is an enlarged cross section of the faucet head according to FIG. 10 with a faucet insert, a control head and a variant of the display unit.
FIG. 12 is a front view of the display unit according to FIG. 11 according to arrow XII
FIG. 13 is a front view of an embodiment of the display unit according to FIG. 11 according to arrow XIII.

The tube coupling 53 for the line 9 may likewise be designed as a mating socket, as this is shown, e.g., in FIGS. 10 and 11. As an alternative, a screw type coupling, which is screwed into a corresponding screw-in opening at the rearward end of the corresponding duct 54 in the faucet insert 50, may be present at the end of the line 9 or the tube 52. This variant is shown in FIG. 14.

FIG. 10 shows an embodiment of the faucet insert 50 and of the control head 69 in connection with a sensor means 3 and a display unit 4 according to the above-described embodiments. FIG. 11 shows for this a variant in an enlarged view. The variant pertains, on the one hand, to the embodiment of the printed circuit board 21. The sensor means 3 is arranged on the top side of the printed circuit board in the above-described manner. The arrangement of a microprocessor 48 is shown in FIG. 11 on the underside or the rear side. This was already mentioned in the above-described exemplary embodiments. The microprocessor 48 ensures the processing of the signals of the sensor means 3 and optionally of the display unit 4. As a result, only processed, preferably digital control signals need to be transmitted via the lines 27, 55 from the processor 48 arranged on the printed circuit board to the control unit 5 and to the processor 35 located there. The amount of lines and cables is markedly reduced as a result. If the electric means at the faucet head 36 or in the control head 69 are supplied with power externally from the control unit 5, cables with two or three wires are sufficient. These cables can be accommodated in the discharge faucet 2 more easily and compactly. In addition, the electric coupling 56 is reduced in size. Furthermore, it is possible in this case to modulate the control signals to the supply voltage, so that a signal line can be dispensed with.

The amount of cables needed can be further reduced if a power supply unit 77, especially an electric battery, is arranged in the faucet head 36 or in the control head 69. This battery may be located, for example, in a free space 78 between the printed circuit board 21 and the front side of the faucet insert 50. The seal 37 may now cover not only the printed circuit board 21 and the processor 48 but also the battery 77 toward the faucet insert 50. The cable 27, 55 is thus used only to transmit control signals to the control unit. In another variant, the electric lines 27, 55 may also be eliminated altogether if the control signals are transmitted in a wireless manner via radio, infrared light or in another manner between the control head 69 and the control unit 5, which have radio modules 38', 38" suitable for this with transmitters and receivers. The above-mentioned remote data transmission interface 38 of the control unit 5 may be designed correspondingly for this purpose. The number of cables may be reduced to the power line by superimposing the control signals to the supply voltage on line 55 by modulation and thus dispensing with a separate signal line 27.

FIGS. 11, 12 and 13 show, furthermore, a variant of the display unit 4, which is equipped with a dot matrix or pixel matrix 66 of very small organic light-emitting diodes, so-called OLEDs. FIGS. 12 and 13 show a top view of the faucet according to arrows XII, XIII in FIG. 11. The OLEDs are arranged on a disk-shaped carrier, which is arranged protected inside the cover 28 or the housing and is covered and protected on the front side in the outward direction by a transparent cover 65.

The display unit 4 may be designed, as in the above-described exemplary embodiments according to FIG. 12, as a display unit 30 in the manner of a large-surface monitor or the like. FIG. 13 shows the variant of a field display 29 with a plurality of field elements formed by the OLEDs 57. The OLEDs 57 are graphics-capable display elements with a very small pixel size and a very fast response behavior. They permit static or moving image displays. A display unit 4 with OLEDs 57 makes possible, furthermore, a color display, optionally with a plurality of different colors. As an alternative, the dense pixel matrix 66 may also be formed by other suitable small light-emitting pixel elements instead of by OLEDs 57.

The contact between the disk with the OLEDs 57 and the printed circuit board 21 can be established by means of any desired and suitable power connection 64, and supply voltages and signal currents are transmitted. As is illustrated in FIG. 11, this power connection 64 may be formed by an elastic cubic pad made of foam rubber or the like with ring circuits, which are arranged on the outside and are located at mutually spaced locations from one another. The pad is located between the sensors 22, 23, 24, 25, 26 on the printed circuit board 21.

Furthermore, FIG. 9 illustrates a variant of the supply means 10. A preferably controllable instantaneous water heater 49, which is connected to the cold water feed 12 and is connected with an, e.g., external energy supply unit 79, is used here for the hot water supply. The water is heated in the instantaneous water heater 49 with heating energy obtained from electricity, gas or the like. The water temperature is measured with a temperature sensor 16, which is connected via a line 27 with the control unit 5, which in turn controls the instantaneous water heater 49 and a valve 13 or a flow limiter. The water temperature can be regulated to a permanently preset value or a value selectable by the operator.

Furthermore, sensors 58, 59 are arranged at the lines 9', 9" for the second and third fluids 18, 19. These may be flow sensors 58, with which the rate of flow is measured and which also indicate whether there is a flow of the medium 18, 19 at all. The sensors 58 are connected with the control unit 5 via lines 27. Other sensors in the form of filling level meters 59, which measure the fluid content in the containers 17 and are likewise connected with the control unit 5 via lines 27, optionally via the intermediary of the flow meter 58, may be associated with the containers 17. When the filling level of the fluids 18, 19 in the containers 17 becomes too low, the control unit 5 sends a warning signal or a call for maintenance.

The operating components of the supply means 10 may be arranged with one another in a common housing 63, to which the containers 17, the fluid lines 9, 9', 9", the power and signal line 55, the power supply unit 60 for the control unit 5, the cold water feed 12, and the energy supply unit 79 are connected on the outside. The housing 63 protectingly surrounds the control unit 5, the instantaneous water heater

49, the pumps 20 and the other sensors described above and other miscellaneous control elements.

An internal energy supply unit 80, e.g., an electric battery, a gas cylinder or the like, which is likewise accommodated in the housing 63, may be present for an autarchic multifunction faucet 1. It is indicated schematically as an alternative in FIG. 9. In addition, it is favorable for this if the control head 69 has an internal power supply unit 77, for example, an electric battery. The energy supply units 77, 79, 80 of the supply means 10 and of the control head 69 may be replaced at the time of the periodic maintenance.

Figure 17:
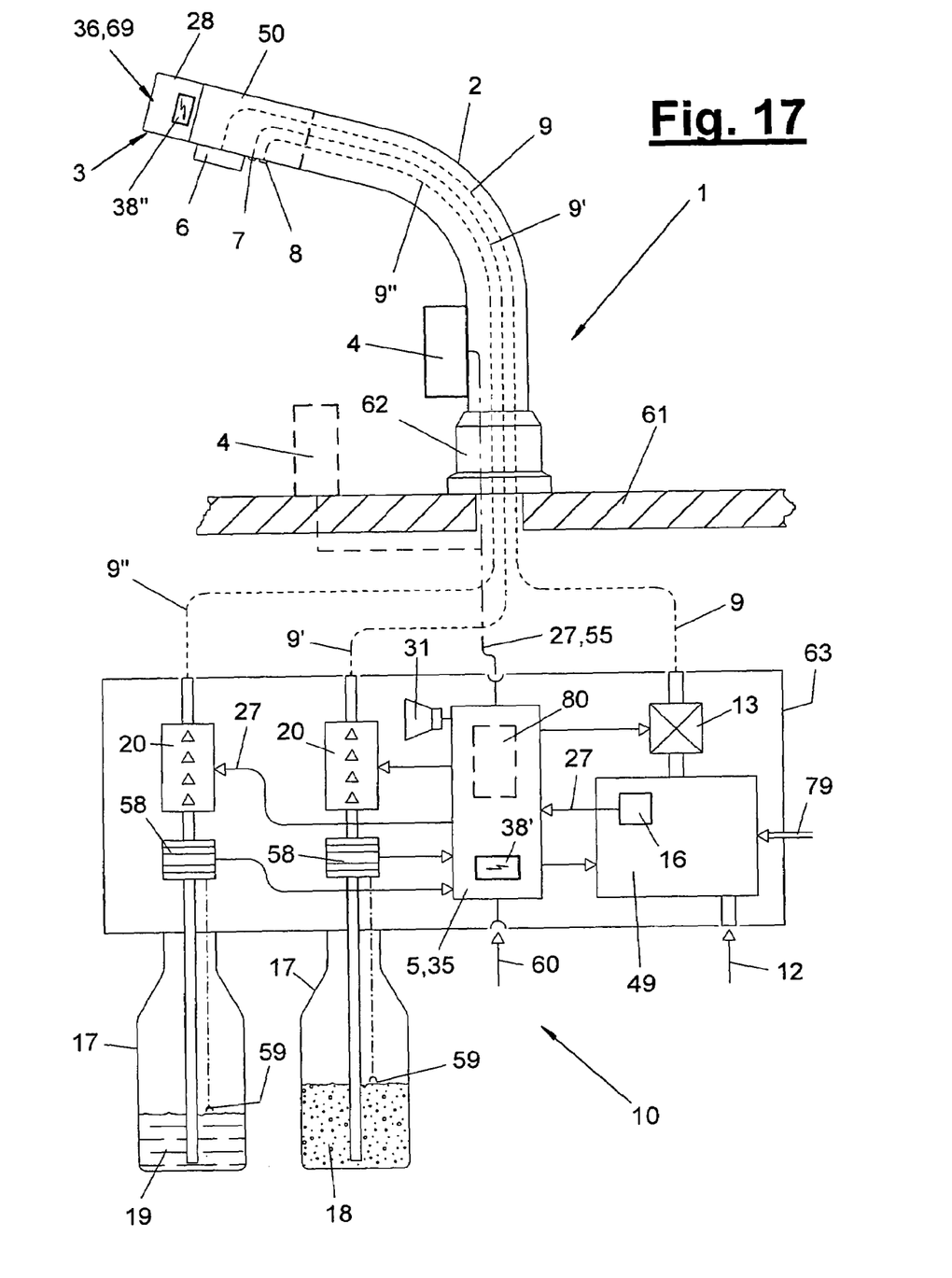
FIG. 17 is a schematic view of another variant of the multifunction faucet according to FIG. 9 with battery operation and a different arrangement of the display.

FIG. 17 shows such an autarchic multifunction faucet 1 of the above-described modular design with a faucet insert 50 and a control head 69, which has an electric battery 77 and a remote data transmission interface 38" for the wireless signal transmission to the control unit 5 and a remote data transmission interface 38' located there. The interfaces 38', 38" may be designed as radio modules with transmitter and receiver units.

In such an embodiment, the battery 77 in the control head 69 may have a limited capacity or can be replaced only at greater intervals. The energy may not be sufficient in these cases for the operation of an optical display 4 in the control head 69. The optical display 4 may be displaced away from the control head 69 to another point of the multifunction faucet 1 or optionally also into the area of the wash basin 69. The control head 69 corresponds to the embodiment according to FIG. 11 with the exception of the missing optical display 4 and has a cover 28 which is closed on the front side.

FIG. 17 shows two alternatives for the external arrangement of the optical display 4. In the variant indicated by solid lines, the optical display 4 is arranged in the foot area 62 of the multifunction faucet 1. It may also be located at another point of the faucet. The alternative drawn in broken lines shows the optical display 4 at the edge of the was basin 61. In both cases, the optical display 4 is connected with the control unit 5 and the internal power supply 79, 80 of the supply unit 10 via an electric line 27, 55. This power supply 79, 80 has a higher capacity than the battery 77 in the control head 69 and permits a longer operating time. In addition, the optical display 4 does not need to be replaced at the time of maintenance and replacement of the control head 69. The optical display 4 is actuated by the control unit 5 via one of the electric lines 27, 55.

While specific embodiments of the invention have been shown and described in detail to illustrate the application of the principles of the invention, it will be understood that the invention may be embodied otherwise without departing from such principles.

APPENDIX

List of Reference Numbers:

| | |
|---|---|
| 1 | Multifunctional faucet |
| 2 | Dispensing faucet |
| 3 | Sensor means |
| 4 | Display |
| 5 | Control |
| 6 | Dispensing opening for fluid 1, water |
| 7 | Dispensing opening for fluid 2, soap |
| 8 | Dispensing opening for fluid 3, disinfectant |
| 9 | Line for fluids |
| 9' | Line for fluid 2, soap |
| 9" | Line for fluid 3, disinfectant |
| 10 | Supply means for fluids |
| 11 | Water feed, hot |
| 12 | Water feed, cold |

APPENDIX-continued

List of Reference Numbers:

| | |
|---|---|
| 13 | Valve |
| 14 | Mixing means |
| 15 | Setting means |
| 16 | Temperature sensor |
| 17 | Container, bottle |
| 18 | Fluid 2, soap |
| 19 | Fluid 3, disinfectant |
| 20 | Pump |
| 21 | Printed circuit board |
| 22 | Sensor, top |
| 23 | Sensor, bottom |
| 24 | Sensor, left |
| 25 | Sensor, right |
| 26 | Sensor, front |
| 27 | Wire, electric |
| 28 | Cover |
| 29 | Optical display, field display |
| 30 | Optical display, display |
| 31 | Acoustic display, loudspeaker |
| 32 | LED, red |
| 33 | LED, green |
| 34 | LED, blue |
| 35 | Microprocessor |
| 36 | Faucet head |
| 37 | Seal, sealant |
| 38 | Data telecommunication interface |
| 38' | Remote data transmission interface, radio module, control unit |
| 38" | Remote data transmission interface, radio module, faucet head |
| 39 | Higher-level control |
| 40 | Alarm system |
| 41 | Reader, transponder, bar code reader |
| 42 | Text field, display field |
| 43 | Switching field, symbol field |
| 44 | Image projection means |
| 45 | Projector |
| 46 | Projection surface |
| 47 | Image beams |
| 48 | Microprocessor on printed circuit board |
| 49 | Heater, instantaneous water heater |
| 50 | Faucet insert |
| 51 | Perlator, aerator, water breaker or water softener |
| 52 | Tube |
| 53 | Tube coupling |
| 54 | Duct |
| 55 | Electric line |
| 56 | Plug, coupling |
| 57 | Display, OLED |
| 58 | Sensor, flow meter |
| 59 | Sensor, filling level meter |
| 60 | Power supply unit |
| 61 | Wash basin |
| 62 | Foot of faucet |
| 63 | Housing |
| 64 | Power connection |
| 65 | Cover |
| 66 | Pixel matrix |
| 67 | Nozzle insert |
| 68 | Passage opening, pipe opening in jacket |
| 69 | Control head |
| 70 | Insert block |
| 71 | Insert opening |
| 72 | Mounting collar |
| 73 | Mounting attachment |
| 74 | Collar |
| 75 | Pipe opening, front side |
| 76 | Groove |
| 77 | Power supply unit, battery |
| 78 | Free space |
| 79 | Power supply unit |
| 80 | Power supply unit |

What is claimed is:

1. A multifunctional faucet, comprising:
a dispensing faucet for dispensing a plurality of fluids including a first fluid and a second fluid, said faucet including a faucet head with one or more fluid dispensing openings;
a sensor means including a first sensor for sensing an input in a first region of operation and generating a first sensor signal, a second sensor for sensing an input in a second region of operation and generating a second sensor signal and a third sensor for sensing an input in a third region of operation and generating a third sensor signal;
a supply means for supplying said plurality of fluids to said dispensing faucet;
a control connected to said dispensing faucet and receiving said first sensor signal for changing a first fluid dispensing state of said dispensing faucet as to said first fluid in response thereto, receiving said second sensor signal for changing a second fluid dispensing state of said dispensing faucet as to said second fluid in response thereto and receiving said third sensor signal for changing a dispensing state of said dispensing faucet as to one of said plurality of fluids in response thereto;
a display displaying first indicia presenting instruction information regarding operation aspects of said first sensor, displaying second indicia presenting instruction information regarding operation aspects of said second sensor and displaying third indicia presenting instruction information regarding operation aspects of said third sensor; and
a sensor support at said faucet head with said sensor means arranged thereon for positioning said first sensor, said second sensor and said third sensor in close proximity respectively to said first indica said second indicia and said third indicia and adjacent to one or more dispensing openings.

2. A multifunction faucet in accordance with claim 1, wherein said support is a printed circuit board with a seal in said faucet head cooperating to seal said printed circuit board, said control including a microprocessor arranged on said printed circuit board, said display being arranged on the front side of said faucet head and being connected with said printed circuit board.

3. A multifunctional faucet in accordance with claim 1, wherein said display is a graphics-capable optical display unit, said display unit having organic light-emitting diodes (OLEDs) that are one of a single color, multi-colored or colored.

4. A multifunctional faucet in accordance with claim 1, wherein said display is a graphics-capable optical display having a field display or a display with a matrix of a plurality of luminous display elements, including liquid crystal cells or LEDs.

5. A multifunctional faucet in accordance with claim 1, wherein said display and said sensor means are surrounded by a cover transparent to infrared light.

6. A multifunctional faucet in accordance with claim 1, wherein said support is a printed circuit board, said display, said sensor means and said printed circuit board with a cover are integrated in a control head in one assembly unit.

7. A multifunctional faucet in accordance with claim 1, further comprising: an acoustic display.

8. A multifunction faucet in accordance with claim 1, wherein said multifunctional faucet has a mixing means which can be controlled or regulated for fluids having different temperatures including hot and cold water, and said third sensor of said sensor means is for changing the temperature in a contactless manner as well as an optical display for the set points and/or actual values of the fluid temperature.

9. A multifunctional faucet in accordance with claim 1, further comprising: an acoustic display for signaling the selection of one of said fluids and for different operating states.

10. A multifunctional faucet in accordance with claim 1, wherein said control has a microprocessor, a time function element and one or more said program memories.

11. A multifunctional faucet in accordance with claim 1, wherein said control has a data telecommunication interface for connection to a higher-level control.

12. A multifunctional faucet in accordance with claim 1, wherein said reader is integrated in said optical display.

13. A multifunction faucet in accordance with claim 1, wherein said supply means has a controllable instantaneous water heater and a temperature sensor.

14. A multifunction faucet in accordance with claim 1, wherein said supply means has one or more fluid containers with a filling level meter.

15. A multifunction faucet in accordance with claim 1, wherein said supply means has a internal power supply unit.

16. A multifunctional faucet in accordance with claim 1, wherein said supply means has a housing surrounding the operating components.

17. A multifunction faucet in accordance with claim 1, wherein a single line or single line set carries a power signal with superimposed control signals by modulation of the power signal.

18. A multifunctional faucet in accordance with claim 1, wherein said display is a graphics-capable optical display designed as an image projection means with a projector arranged at said dispensing faucet.

19. A multifunctional faucet in accordance with claim 18, wherein a projection surface is arranged at said dispensing faucet.

20. A multifunctional faucet in accordance with claim 1, further comprising a reader connected to said control for operating instructions.

21. A multifunctional faucet in accordance with claim 20, wherein said reader is designed as a transponder means or as a bar code reader.

22. A multifunction faucet in accordance with claim 1, wherein a faucet insert is detachably arranged at the upper end in said tubular discharge faucet, said faucet insert having a plurality of ducts located on the inside, which said ducts are connected with tube couplings for tube-like fluid lines on the inlet side and with discharge openings for different fluids in the jacket area on the outlet side, wherein said corresponding passage openings are present in the jacket of said discharge faucet.

23. A multifunction faucet in accordance with claim 22, wherein an aerator, water breaker or a nozzle insert, which protrudes to the outside through said corresponding passage opening in the mounted position, is detachably arranged in at least one said discharge opening.

24. A multifunction faucet in accordance with claim 22, wherein said faucet insert has an insert block made of a corrosion-resistant material with said ducts, said tube couplings and said discharge openings for the more corrosive fluids.

25. A multifunction faucet in accordance with claim 23, wherein said control head is connected with said faucet insert.

26. A multifunction faucet in accordance with claim 23, wherein a longitudinally extending groove or a duct for receiving a electric line and optionally an electric coupling is arranged at said faucet insert.

27. A multifunction faucet in accordance with claim 23, wherein a power supply unit with a battery, for said sensor means, said display unit and the other electric components of said control head is arranged at said faucet insert or in a control head.

28. A multifunction faucet in accordance with claim 27, further comprising a remote data transmission interface for a wireless signal radio connection with said control unit, said transmission interface being arranged at the faucet insert or in said control head.

29. A multifunction faucet in accordance with claim 27, wherein said display is an optical display with changeable display features in addition to or as part of said first indicia, said second indicia and said third indicia.

30. A multifunctional faucet, comprising:
- a dispensing faucet for dispensing a plurality of fluids including a first fluid and a second fluid, whose state may vary, said faucet including a faucet head with one or more fluid dispensing openings;
- a sensor including a first sensor for sensing an input in a first region of operation and generating a first sensor signal, a second sensor for sensing an input in a second region of operation and generating a second sensor signal and a third sensor for sensing an input in a third region of operation and generating a third sensor signal;
- a supply means for supplying said plurality of fluids to said dispensing faucet;
- a control connected to said dispensing faucet and receiving said first sensor signal for changing a first fluid dispensing state of said dispensing faucet based on said first sensor signal, receiving said second sensor signal for changing a second fluid dispensing state of said dispensing faucet based on said second sensor signal and receiving said third sensor signal for changing a dispensing state of said dispensing faucet based on said third sensor signal;
- a display unit connected to said faucet at a location adjacent to said sensors, said display unit including a display of first indicia presenting instruction information regarding operation aspects of said first sensor, a display of second indicia presenting instruction information regarding operation aspects of said second sensor and displaying third indicia presenting instruction information regarding operation aspects of said third sensor; and
- a faucet insert detachably arranged at the upper end in said faucet, said faucet insert having a plurality of said ducts located on the inside, said ducts being connected with tube couplings for fluid lines on an inlet side and with discharge openings for different fluids in a jacket area on an outlet side, wherein said corresponding passage openings are present in the jacket of said discharge faucet.

* * * * *